(12) United States Patent
Yoshikane et al.

(10) Patent No.: US 9,841,066 B2
(45) Date of Patent: Dec. 12, 2017

(54) HAMMER DRILL

(71) Applicant: MAKITA CORPORATION, Anjo-shi, Aichi (JP)

(72) Inventors: Kiyonobu Yoshikane, Anjo (JP); Kenji Shibata, Anjo (JP); Yoshitaka Machida, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 913 days.

(21) Appl. No.: 14/080,260

(22) Filed: Nov. 14, 2013

(65) Prior Publication Data

US 2014/0174871 A1 Jun. 26, 2014

(30) Foreign Application Priority Data

Dec. 26, 2012 (JP) ................. 2012-283068

(51) Int. Cl.
*F16D 21/00* (2006.01)
*B25D 16/00* (2006.01)

(52) U.S. Cl.
CPC ........... *F16D 21/00* (2013.01); *B25D 16/003* (2013.01); *B25D 2216/0015* (2013.01); *B25D 2216/0023* (2013.01); *B25D 2216/0038* (2013.01); *B25D 2216/0084* (2013.01); *B25D 2250/371* (2013.01)

(58) Field of Classification Search
CPC .......... B25D 16/003; B25D 2216/0015; B25D 2216/0038; B25D 2216/0084; B25D 2216/0023; B25D 2250/371; F16D 21/00
USPC ....................................... 192/48.1
See application file for complete search history.

(56) References Cited

U.S. PATENT DOCUMENTS

| 6,035,945 A * | 3/2000 | Ichijyou | B25D 11/062 |
| | | | 173/109 |
| 2004/0231866 A1 | 11/2004 | Droste | |
| 2010/0025059 A1* | 2/2010 | Felger | B25D 16/006 |
| | | | 173/47 |
| 2010/0319946 A1* | 12/2010 | Ullrich | B25D 16/003 |
| | | | 173/122 |
| 2012/0193116 A1 | 8/2012 | Ullrich et al. | |
| 2012/0205132 A1* | 8/2012 | Wang | B25D 16/006 |
| | | | 173/48 |

FOREIGN PATENT DOCUMENTS

| CN | 2920563 Y | 7/2007 |
| DE | 10 2007 010 179 A1 | 9/2008 |

(Continued)

OTHER PUBLICATIONS

Extended Search Report issued in European Patent Application No. 13195545.2 dated Feb. 14, 2014.

(Continued)

*Primary Examiner* — Robert Long
*Assistant Examiner* — Xavier A Madison
(74) *Attorney, Agent, or Firm* — Oliff PLC

(57) ABSTRACT

In a hammer drill, a coil spring that urges a first clutch and a second clutch in directions away from each other is held between a first change plate that engages with the first clutch to be slidable in the axial direction of an intermediate shaft and a second change plate that engages with the second clutch to be slidable in the axial direction of the intermediate shaft. The first change plate is slidably guided by a gear housing.

14 Claims, 19 Drawing Sheets

(56) References Cited

FOREIGN PATENT DOCUMENTS

| | | |
|---|---|---|
| EP | 1 987 925 A1 | 11/2008 |
| JP | H08-141937 A | 6/1996 |
| JP | A-9-70771 | 3/1997 |
| JP | H10-291173 A | 11/1998 |
| WO | 2008/009211 A1 | 1/2008 |

OTHER PUBLICATIONS

Feb. 6, 2017 Office Action issued in Japanese Patent Application No. 2013-267639.

\* cited by examiner

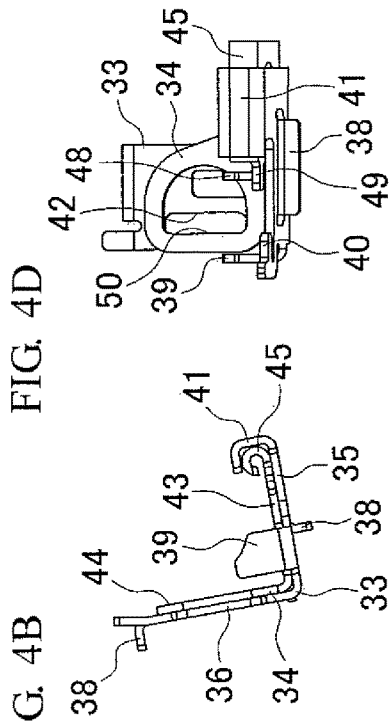
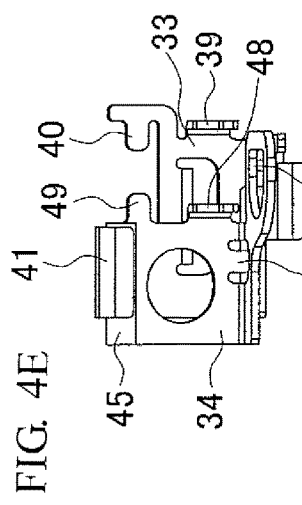
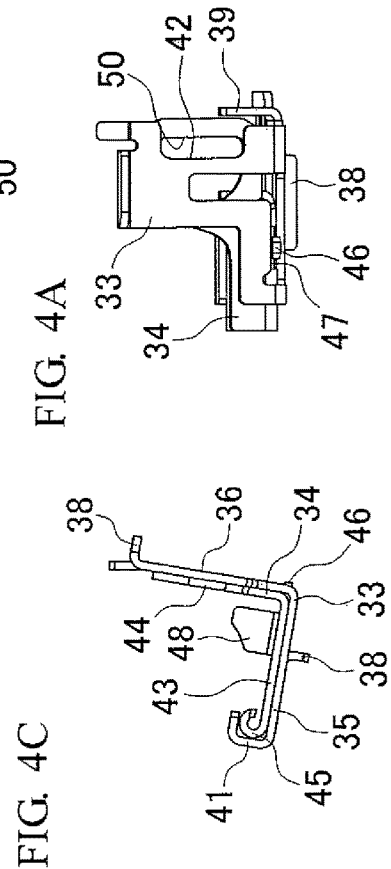
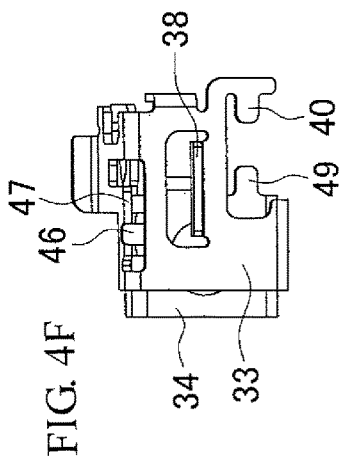
FIG. 4A  FIG. 4B  FIG. 4C  FIG. 4D  FIG. 4E  FIG. 4F

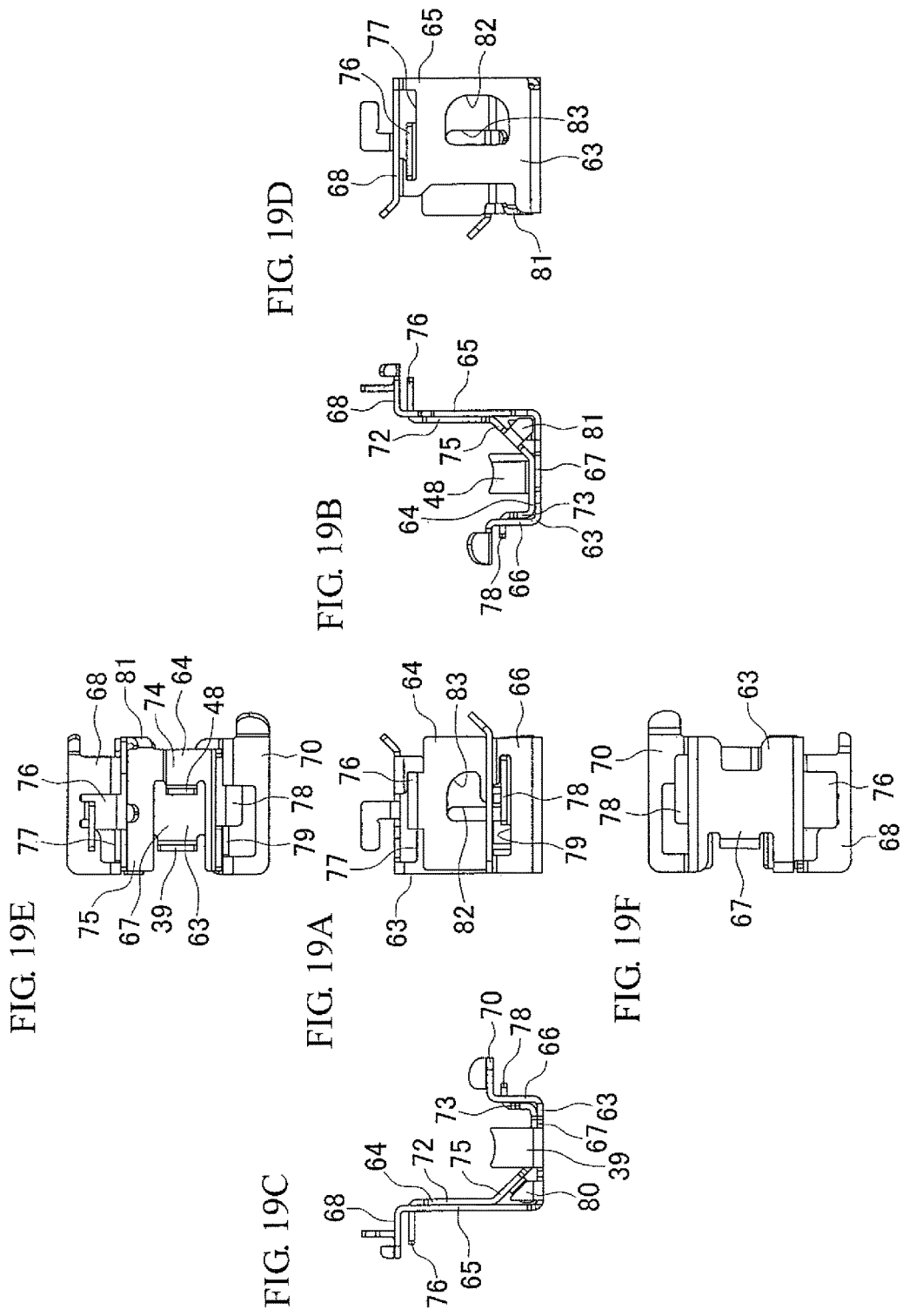

HAMMER DRILL

BACKGROUND OF THE INVENTION

This application claims the benefit of Japanese Patent Application Number 2012-283068 filed on Dec. 26, 2012, the entirety of which is incorporated by reference.

FIELD OF THE INVENTION

The present invention relates to a hammer drill that enables selecting one of at least three operation modes including a hammer mode, a hammer drill mode, and a drill mode.

DESCRIPTION OF RELATED ART

In a hammer drill, an intermediate shaft is interposed between an output shaft of a motor and a tool holder that holds a bit. An impact transfer member and a rotation transfer member are each rotatably provided on the intermediate shaft. The impact transfer member transfers an impact to the bit. The rotation transfer member transfers rotation to the tool holder. A clutch is provided between the impact transfer member and the rotation transfer member. The clutch is rotatable together with the intermediate shaft, and movable in the axial direction. One of operation modes is selectable by an operation of sliding the clutch performed from outside a housing. There are at least three operation modes including a hammer mode in which the clutch engages with only the impact transfer member, a hammer drill mode in which the clutch engages with the impact transfer member and the rotation transfer member concurrently, and a drill mode in which the clutch engages with only the rotation transfer member.

In such a hammer drill, as described in Japanese Patent Application Publication No. 09-70771 (JP 09-70771 A), two clutches are provided, namely a first clutch (first sleeve) capable of engaging with only the impact transfer member and a second clutch (second sleeve) capable of engaging with only the rotation transfer member. One coil spring serving as an elastic element is interposed between the clutches to urge the clutches in directions away from each other. One of the three operation modes described above is selectable by sliding a plate that engages with the clutches in the axial direction of the intermediate shaft from outside the housing.

In the hammer drill according to the related art described above, however, since the coil spring is interposed between the two clutches, the intermediate shaft is made longer in the axial direction, which hinders making the hammer drill compact.

SUMMARY OF THE INVENTION

It is therefore an object of the present invention to provide a hammer drill that can be made compact with no need for a long intermediate shaft even if two clutches are used.

In order to achieve the foregoing object, a first aspect of the present invention provides a hammer drill including an intermediate shaft, an impact transfer member and a rotation transfer member, a first clutch and a second clutch, and an elastic element.

The intermediate shaft is provided in a housing between a motor and a tool holder, to which a bit is mountable, to receive rotation from the motor.

The impact transfer member and a rotation transfer member are each rotatably provided on the intermediate shaft. The impact transfer member is configured to cause an impact mechanism portion provided on the tool holder to operate, and the rotation transfer member is configured to rotate the tool holder.

The first clutch and a second clutch are provided between the impact transfer member and the rotation transfer member so as to be rotatable together with the intermediate shaft and slidable in an axial direction of the intermediate shaft. The first clutch is releasably engageable with the impact transfer member, and the second clutch is releasably engageable with the rotation transfer member.

The elastic element urges the first clutch and the second clutch in directions away from each other.

In the hammer drill, one of a slide position at which only the first clutch engages with the impact transfer member, a slide position at which the first clutch engages with the impact transfer member and the second clutch engages with the rotation transfer member, and a slide position at which only the second clutch engages with the rotation transfer member is selectable by an operation of sliding the first clutch and the second clutch performed from outside the housing.

The elastic element is held between a first clutch operation member and a second clutch operation member. The first clutch operation member engages with the first clutch to be slidable in the axial direction of the intermediate shaft. The second clutch operation member engages with the second clutch to be slidable in the axial direction of the intermediate shaft. At least one of the first and second clutch operation members is slidably guided by the housing or the intermediate shaft.

A second aspect of the present invention provides the hammer drill according to the first aspect, in which one of the first and second clutch operation members is guided by the housing or the intermediate shaft, and the other is guided by the one of the clutch operation members.

A third aspect of the present invention provides the hammer drill according to the first or second aspect, in which the first and second clutch operation members are provided with respective restraint portions that abut against each other to restrain slide due to urging by the elastic element.

A fourth aspect of the present invention provides the hammer drill according to the third aspect, in which the elastic element is compressed in a state where the restraint portions restrain slide.

A fifth aspect of the present invention provides the hammer drill according to the first aspect, in which the housing is provided with respective positioning portions that restrain slide of the first and second clutch operation members at a position at which the first clutch engages with the impact transfer member and the second clutch engages with the rotation transfer member.

A sixth aspect of the present invention provides the hammer drill according to the first aspect, in which the first and second clutch operation members are each guided by the housing.

A seventh aspect of the present invention provides the hammer drill according to the first aspect, in which the first clutch and the second clutch have the same shape.

According to the first aspect of the present invention, it is possible to provide a hammer drill that can be made compact with no need for a long intermediate shaft even if two clutches, namely the first and second clutches, are used.

According to the second aspect of the present invention, in addition to the effect of the first aspect, one of the clutch operation members is guided by the other. Thus, the structure is expected to be simplified with no need for a guide member for the one of the clutch operation members.

According to the third aspect of the present invention, in addition to the effect of the first or second aspect, the adoption of the restraint portions enables the first and second clutch operation members to be properly assembled. Accordingly, the ease of assembly of the clutch operation members is improved.

According to the fourth aspect of the present invention, in addition to the effect of the third aspect, the elastic element is prevented from slipping off with the first and second clutch operation members in the assembled state. The ease of assembly of the elastic element is improved.

According to the fifth aspect of the present invention, in addition to the effect of the first aspect, the adoption of the positioning portions allows the first clutch and the second clutch to engage with the impact transfer member and the rotation transfer member, respectively, at a proper position and without being pressed. Thus, heat generation is prevented.

According to the sixth aspect of the present invention, in addition to the effect of the first aspect, the clutch operation members are allowed to slide with the same sliding performance.

According to the seventh aspect of the present invention, in addition to the effect of the first aspect, the assembly is facilitated, and the trouble of part management is reduced.

BRIEF DESCRIPTION OF THE DRAWINGS

FIGS. 4A to 4F illustrate the first and second change plates, in which FIG. 4A is a front view, FIG. 4B is a right side view, FIG. 4C is a left side view, FIG. 4D is a back view, FIG. 4E is a plan view, and FIG. 4F is a bottom view.

FIGS. 19A to 19F illustrate the first and second change plates, in which FIG. 19A is a front view, FIG. 19B is a right side view, FIG. 19C is a left side view, FIG. 19D is a back view, FIG. 19E is a plan view, and FIG. 19F is a bottom view.

DETAILED DESCRIPTION OF THE EMBODIMENTS

An embodiment of the present invention will be described below with reference to the drawings.

Figure 1:
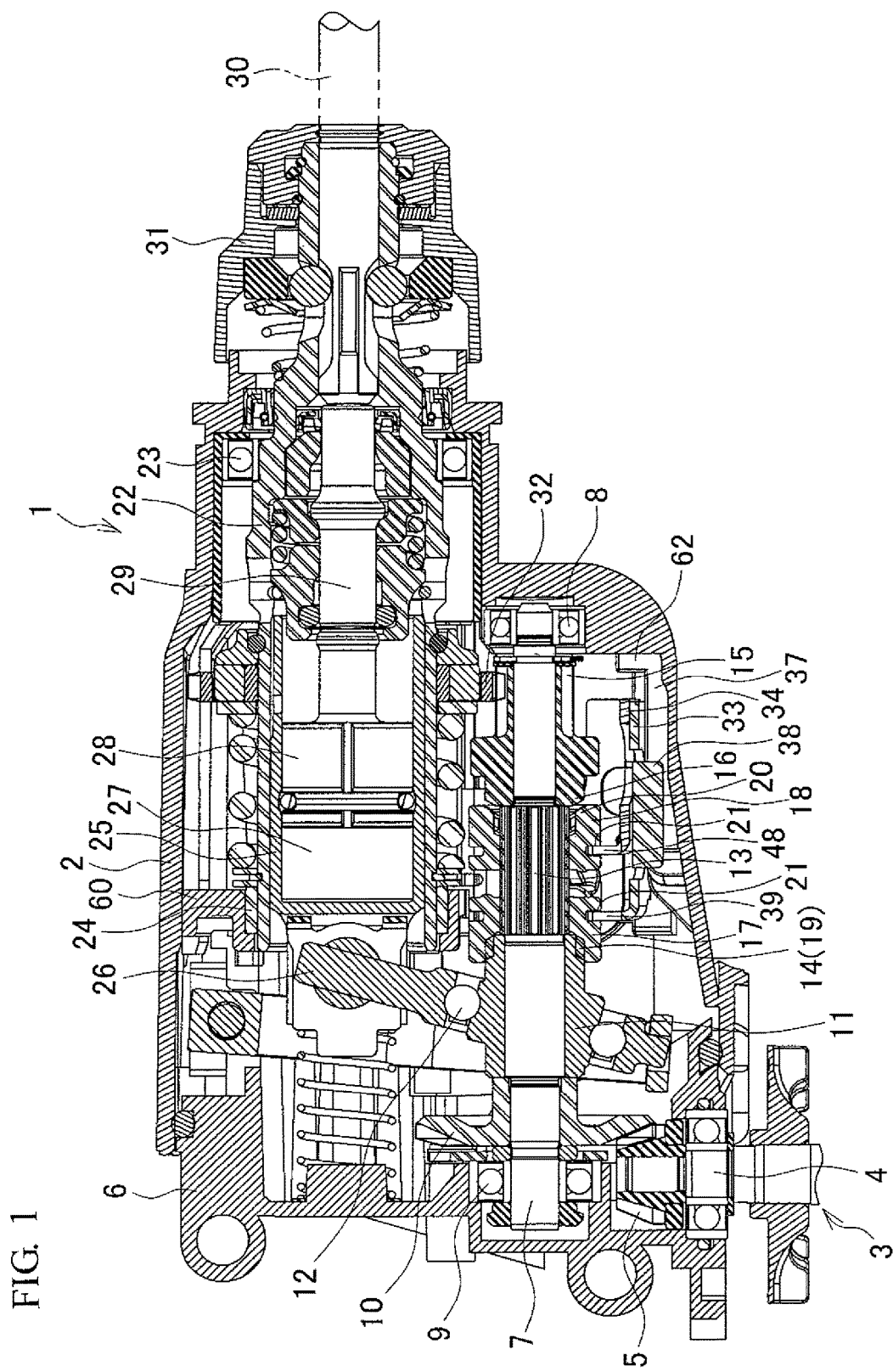
FIG. 1 is a partial vertical sectional view of a hammer drill (hammer mode).

FIG. 1 is a partial vertical sectional view of an example of a hammer drill. In a hammer drill 1, a motor 3 is accommodated in a motor housing (not illustrated) so as to be directed upward in the lower portion of the rear (with the right side of FIG. 1 defined as the front) of a gear housing 2 serving as a housing. An output shaft 4 of the motor 3 is supported by an inner housing 6 assembled to the rear portion in the gear housing 2. The output shaft 4 extends into the gear housing 2. An intermediate shaft 7 is disposed in the front-rear direction above the output shaft 4 and between the gear housing 2 and the inner housing 6. The intermediate shaft 7 is rotatably supported by ball bearings 8 and 9 at the front and rear ends, respectively. A bevel gear 10 fixed to the rear portion of the intermediate shaft 7 is meshed with a pinion 5 fixed to the distal end of the output shaft 4.

A boss sleeve 11 serving as an impact transfer member is rotatably provided on the intermediate shaft 7 in front of the bevel gear 10. A swash bearing 12 is externally mounted to the boss sleeve 11, in which the axis of the swash bearing 12 is inclined. A spline portion 13 is formed in front of the boss sleeve 11. Movement of the boss sleeve 11 in the axial direction is restrained by the bevel gear 10 and the spline portion 13. Engagement teeth 14 are formed at the front end of the boss sleeve 11.

A second gear 15 serving as a rotation transfer member is rotatably provided on the intermediate shaft 7 in front of the spline portion 13. Movement of the second gear 15 in the axial direction is restrained. Engagement teeth 16 are formed at the rear end of the second gear 15.

Two clutches, namely first and second clutches 17 and 18, are coupled to the spline portion 13 between the boss sleeve 11 and the second gear 15 so as to be movable in the front-rear direction along the spline portion 13 and rotatable together with the intermediate shaft 7. The first and second clutches 17 and 18 are in the form of sleeves disposed symmetrically in the front-rear direction. Cam teeth 19 that are engageable with the engagement teeth 14 of the boss sleeve 11 are formed at the rear end of the first clutch 17. Cam teeth 20 that are engageable with the engagement teeth 16 of the second gear 15 are formed at the front end of the second clutch 18. A groove 21 for retention of first and second change plates 33 and 34 to be discussed later is formed in the peripheral surface of each of the first and second clutches 17 and 18.

A tool holder 22 is rotatably supported via a ball bearing 23 and a bearing 24 in the gear housing 2 above the intermediate shaft 7 so as to be in parallel with the intermediate shaft 7. A piston cylinder 25 is accommodated in the rear portion of the tool holder 22 so as to be movable in the front-rear direction. The rear end of the piston cylinder 25 is coupled to an arm 26 provided to the swash bearing 12. An impact element 28 is accommodated inside the piston cylinder 25 via an air chamber 27 so as to be movable in the front-rear direction. An intermediate element 29 is accommodated in the tool holder 22 in front of the impact element 28 so as to be movable in the front-rear direction. The piston cylinder 25, the impact element 28, and the intermediate element 29 form an impact mechanism portion. Reference numeral 30 denotes a bit inserted into the tool holder 22 in front of the intermediate element 29. An operation sleeve 31 is provided at the front end of the tool holder 22 to lock and release the inserted bit 30. The tool holder 22 is provided with a gear 32 to be meshed with the second gear 15.

The operation mode of the hammer drill 1 is decided in accordance with the slide position of the first and second clutches 17 and 18 along the spline portion 13 of the intermediate shaft 7.

At a slide position at which the first clutch 17 engages with the boss sleeve 11 and the second clutch 18 is disengaged from the second gear 15, rotation of the intermediate shaft 7 is transmitted to the boss sleeve 11 via the first clutch 17, and converted into swinging motion of the arm 26 in the front-rear direction by the swash bearing 12 so that the piston cylinder 25 is reciprocated. Hence, the impact element 28 is reciprocated by the action of an air spring of the air chamber 27 so that the bit 30 is impacted via the intermediate element 29 (hammer mode).

At a slide position at which the first clutch 17 engages with the boss sleeve 11 and the second clutch 18 engages with the second gear 15, rotation of the intermediate shaft 7 is transmitted to the boss sleeve 11 via the first clutch 17 so that the piston cylinder 25 is reciprocated and the bit 30 is impacted. In addition, rotation of the intermediate shaft 7 is transmitted to the second gear 15 via the second clutch 18 so that the tool holder 22 is rotated via the gear 32. Hence, not only an impact but also rotation is applied to the bit 30 (hammer drill mode).

At a slide position at which the first clutch 17 is disengaged from the boss sleeve 11 and the second clutch 18 engages with the second gear 15, rotation of the intermediate shaft 7 is transmitted to the second gear 15 via the second clutch 18 so that the tool holder 22 is rotated via the gear 32. Hence, only rotation is applied to the bit 30 (drill mode).

Figure 2:
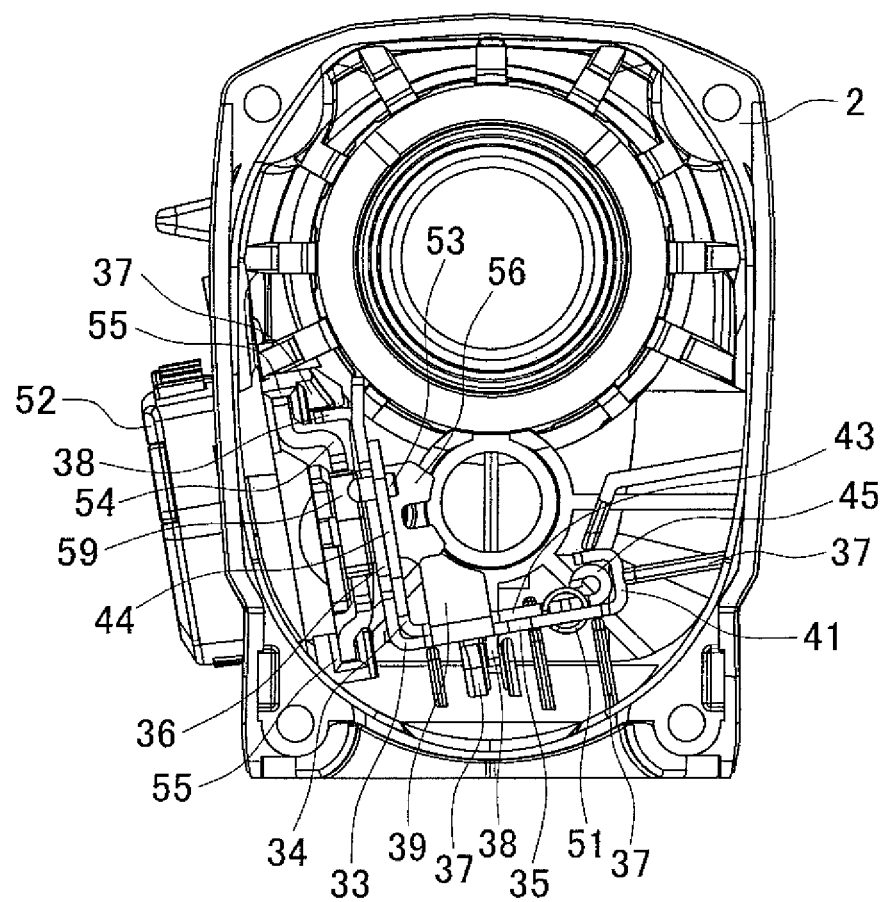
FIG. 2 illustrates a gear housing as seen from the rear (with an intermediate shaft, a tool holder, etc. not illustrated).
Figure 3A:
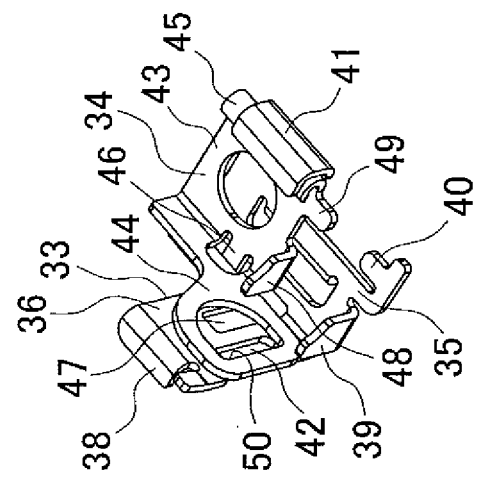
FIGS. 3A and 3B are each a perspective view of first and second change plates.
Figure 3B:
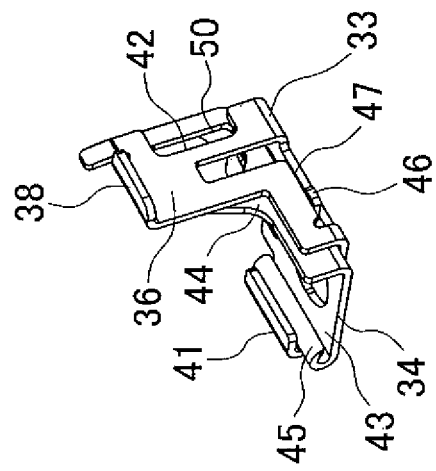

The slide position of the first and second clutches 17 and 18 is decided by a slide operation of the first and second change plates 33 and 34 serving as first and second clutch operation members provided on the outer side of the first and second clutches 17 and 18, respectively. As illustrated in FIGS. 2 to 4, the first change plate 33 is an L-shaped metal plate formed by a horizontal plate portion 35 and a vertical plate portion 36. The first change plate 33 is supported by a plurality of ribs 37 so as to be slidable in the front-rear direction. The plurality of ribs 37 are provided on the inner surface of the gear housing 2 so as to extend in the front-rear direction. Folded pieces 38 and 38 formed to extend outward are positioned between the ribs 37 and 37 and under the rib 37 to restrain movement of the first change plate 33 in the left-right direction and upward movement of the first change plate 33. A first engagement piece 39 is formed at the rear end of the horizontal plate portion 35. The first engagement piece 39 is folded inward to engage with the groove 21 of the first clutch 17. A spring receiving projection 40 directed forward is formed at the rear portion of the outer periphery of the horizontal plate portion 35. A guide portion 41 folded in an angular U shape is formed at the front portion of the outer periphery of the horizontal plate portion 35. A rectangular notched portion 42 is formed at the rear end of the vertical plate portion 36.

The second change plate 34 is also an L-shaped metal plate formed by a horizontal plate portion 43 and a vertical plate portion 44. The second change plate 34 is superposed on the first change plate 33. The second change plate 34 is supported so as to be slidable in the front-rear direction on the first change plate 33 in a state where a folded portion 45 is fitted with the guide portion 41 of the first change plate 33 and a projection 46 is inserted into a horizontal portion of an L-shaped slit 47. The folded portion 45 is formed in a curled shape at the outer periphery of the horizontal plate portion 43. The projection 46 serves as a restraint portion formed opposite to the folded portion 45. The slit 47 serves as a restraint portion formed in the vertical plate portion 36 of the first change plate 33. A second engagement piece 48 folded inward is formed at the rear end of the horizontal plate portion 43 of the second change plate 34. The second engagement piece 48 overlaps the first engagement piece 39 of the first change plate 33 in the front-rear direction, and engages with the groove 21 of the second clutch 18. A spring receiving projection 49 directed rearward is formed at the rear portion of the outer periphery of the horizontal plate portion 43 to face the spring receiving projection 40 of the first change plate 33. A through hole 50 is formed at the rear end of the vertical plate portion 44. The rear edge of the through hole 50 extends linearly in the up-down direction.

A coil spring 51 (FIGS. 2 and 6) serving as an elastic element is provided between the spring receiving projection 40 of the first change plate 33 and the spring receiving projection 49 of the second change plate 34. The coil spring 51 urges the first change plate 33 and the second change plate 34 in directions away from each other. The plates 33 and 34 are displaced from each other in the front-rear direction most at a position at which the projection 46 of the second change plate 34 reaches the front end of the horizontal portion of the slit 47 of the first change plate 33. A mode switching lever 52 (FIG. 2) is rotatably mounted to the side surface of the gear housing 2. As illustrated in FIG. 7, a pin 53 provided at an eccentric position of the mode switching lever 52 penetrates both the notched portion 42 and the through hole 50 overlapping each other. In this configuration, the first change plate 33 is restrained from sliding rearward at a position at which the rear end of the vertical plate portion 36 abuts against the pin 53 in the notched portion 42. Further, the second change plate 34 is restrained from sliding forward at a position at which the rear edge of the through hole 50 abuts against the pin 53.

Figure 5:
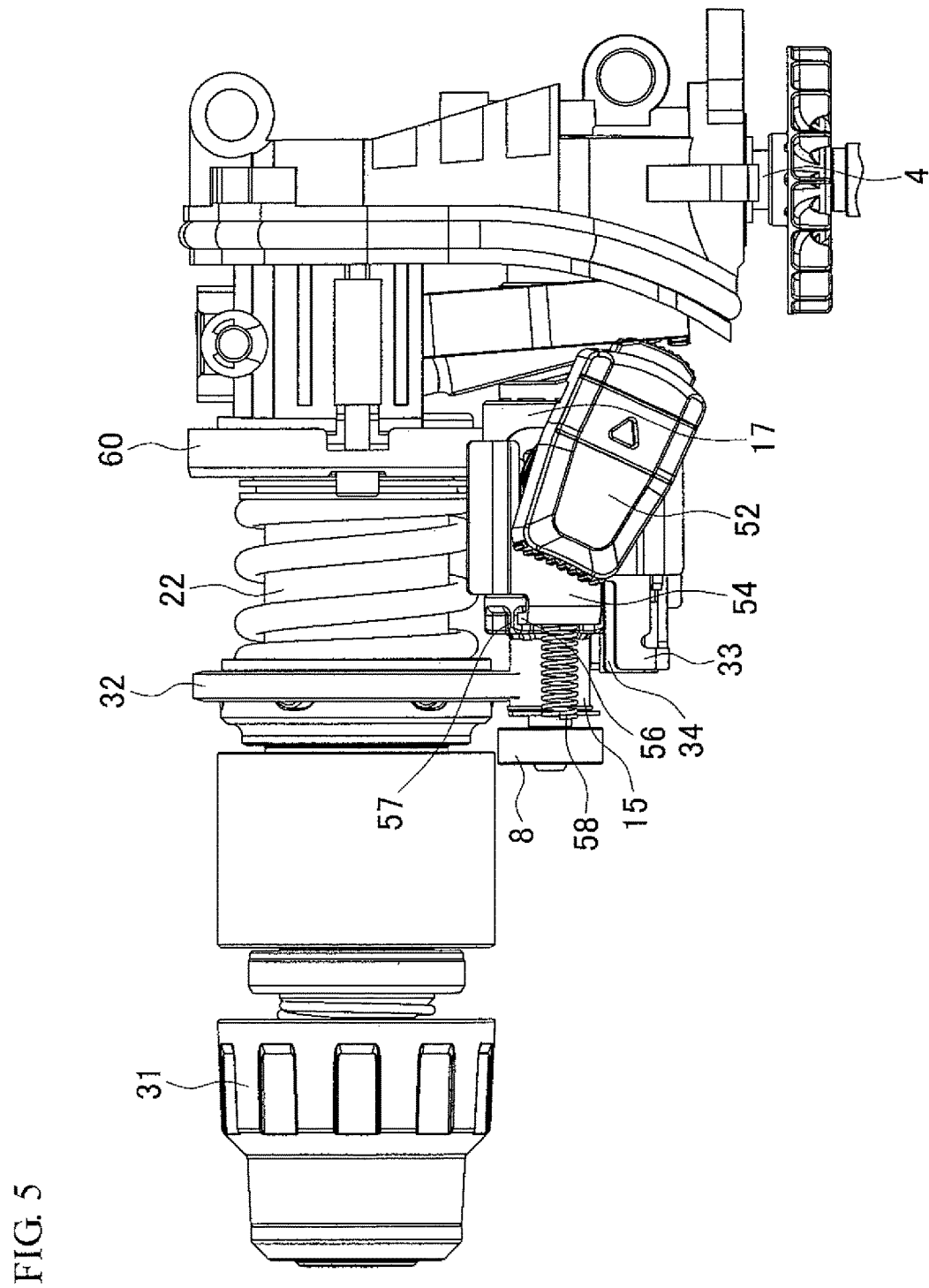
FIG. 5 is a side view of the hammer drill with the gear housing not illustrated (hammer mode).
Figure 6:
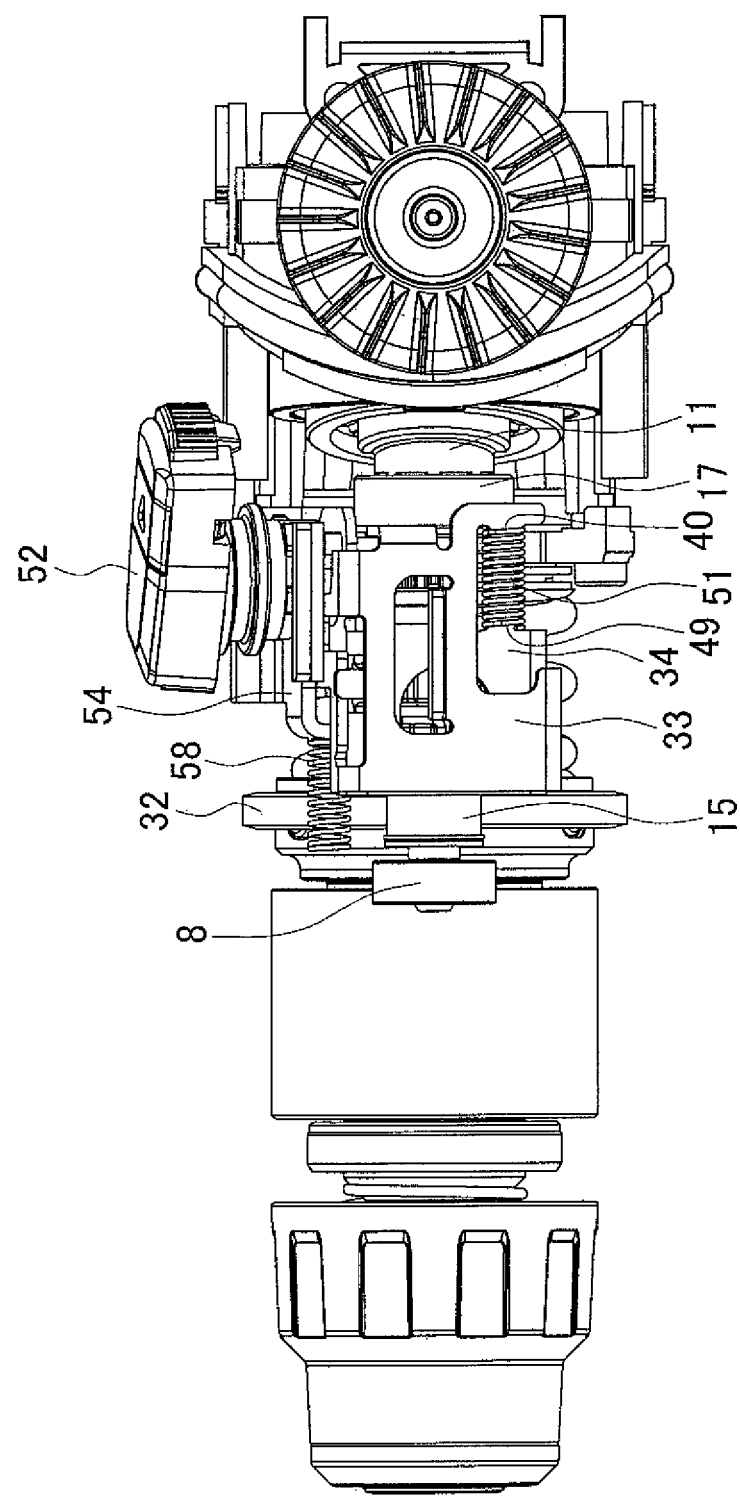
FIG. 6 is a bottom view of the hammer drill with the gear housing not illustrated (hammer mode).
Figure 7:
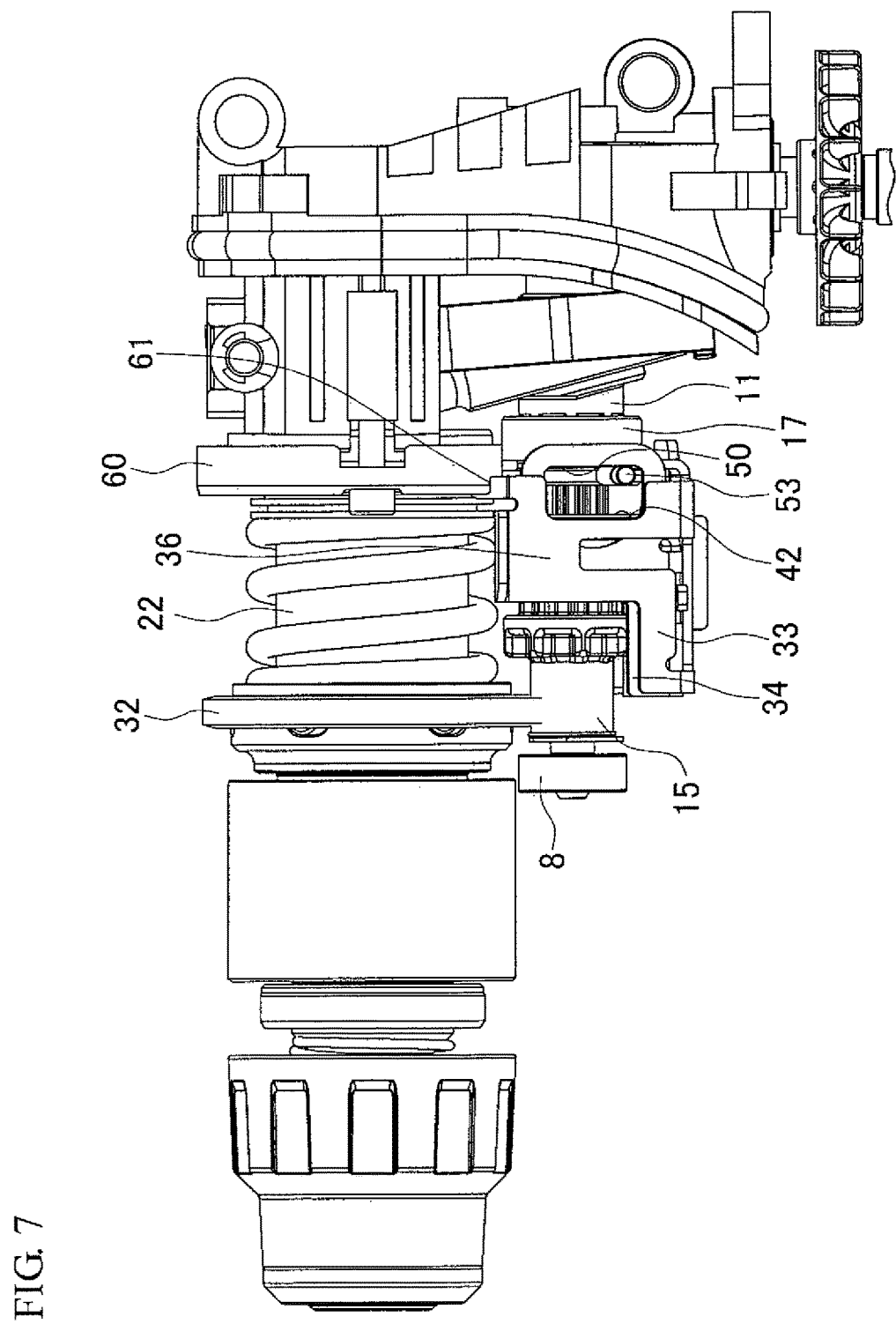
FIG. 7 is a side view of the hammer drill with the gear housing, a mode switching lever (excluding a pin), and a lock plate not illustrated (hammer mode).

As illustrated in FIGS. 2, 5, and 6, a lock plate 54 is provided on the outer side of the vertical plate portion 36 of the first change plate 33 so as to be slidable in the front-rear direction by guide ribs 55 provided on the inner surface of the gear housing 2. A lock piece 56 folded at a right angle toward the second gear 15 is provided at the front end of the lock plate 54. At the retracted position, the distal end of the lock piece 56 can engage with lock teeth 57 provided at the front portion of the second gear 15. A coil spring 58 is provided between the lock piece 56 and the inner surface of the gear housing 2 to urge the lock plate 54 rearward. The rear end of the lock plate 54 abuts against a cam portion 59 provided close to the root of the pin 53 of the mode switching lever 52. The lock plate 54 is slidable in the front-rear direction in accordance with the position of the cam portion 59.

In the hammer drill 1 configured as described above, the slide position of the first and second clutches 17 and 18 is selectable by sliding the first and second change plates 33 and 34 through an operation of rotating the mode switching lever 52.

First, at a rotational position at which the mode switching lever 52 has been rotated maximally rightward toward the gear housing 2 as illustrated in FIGS. 5 and 6, the pin 53 abuts against the lower side of the rear edge of the through hole 50 of the second change plate 34 to slide the second change plate 34 to the retracted position as illustrated in FIG. 7. Then, the first change plate 33 is also urged rearward via the coil spring 51. Hence, as illustrated in FIG. 1, the second clutch 18 retained with the second engagement piece 48 of the second change plate 34 is slid to the retracted position at which the second clutch 18 is disengaged from the second gear 15, and the first clutch 17 retained with the first engagement piece 39 of the first change plate 33 is retracted to engage with the boss sleeve 11. In this manner, the hammer drill 1 is put in the hammer mode.

At this time, as illustrated in FIG. 7, the rear end of the vertical plate portion 36 of the first change plate 33 is retained with a notch 61 serving as a positioning portion formed in the front surface of an inner support 60 that holds the bearing 24. Hence, the first change plate 33 is positioned at the retracted position at which the first clutch 17 engages with the boss sleeve 11.

In the hammer mode, meanwhile, the cam portion 59 of the mode switching lever 52 slides the lock plate 54 to the retracted position. Thus, rotation of the second gear 15 engaged with the lock piece 56 is restrained, and also rotation of the tool holder 22 is locked via the gear 32.

Figure 8:
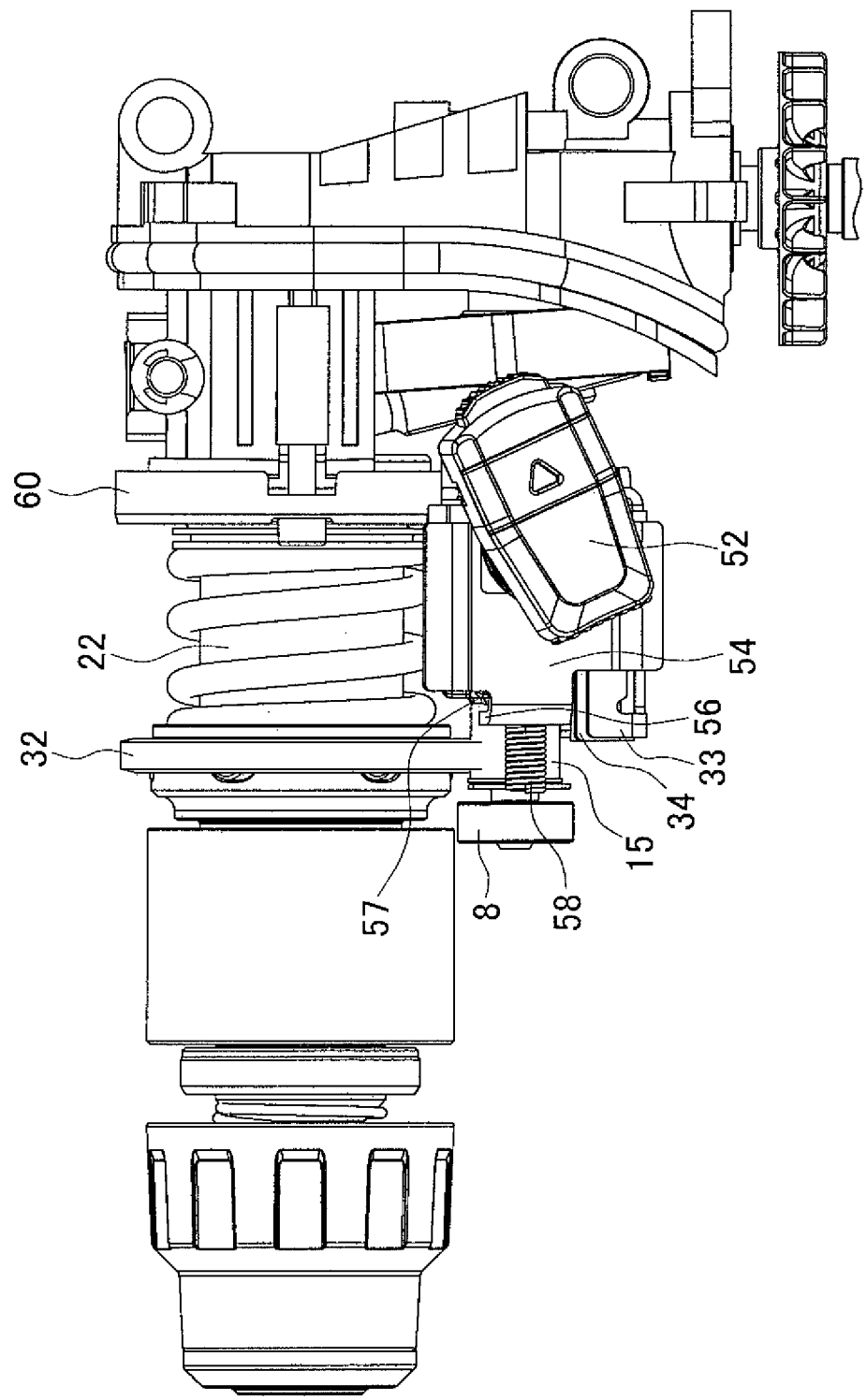
FIG. 8 is a side view of the hammer drill with the gear housing not illustrated (neutral mode).
Figure 9:
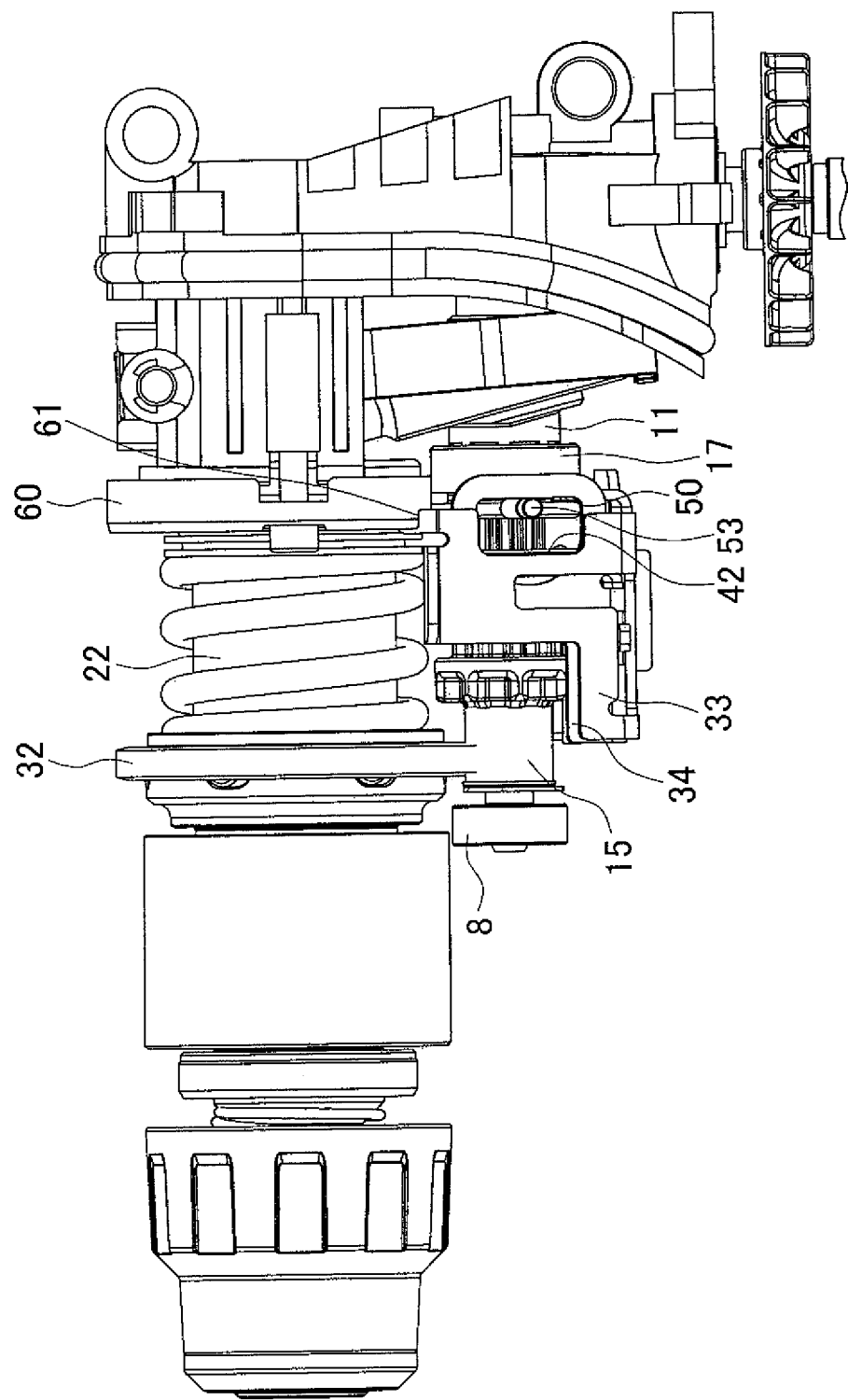
FIG. 9 is a side view of the hammer drill with the gear housing, the mode switching lever (excluding the pin), and the lock plate not illustrated (neutral mode).
Figure 10:
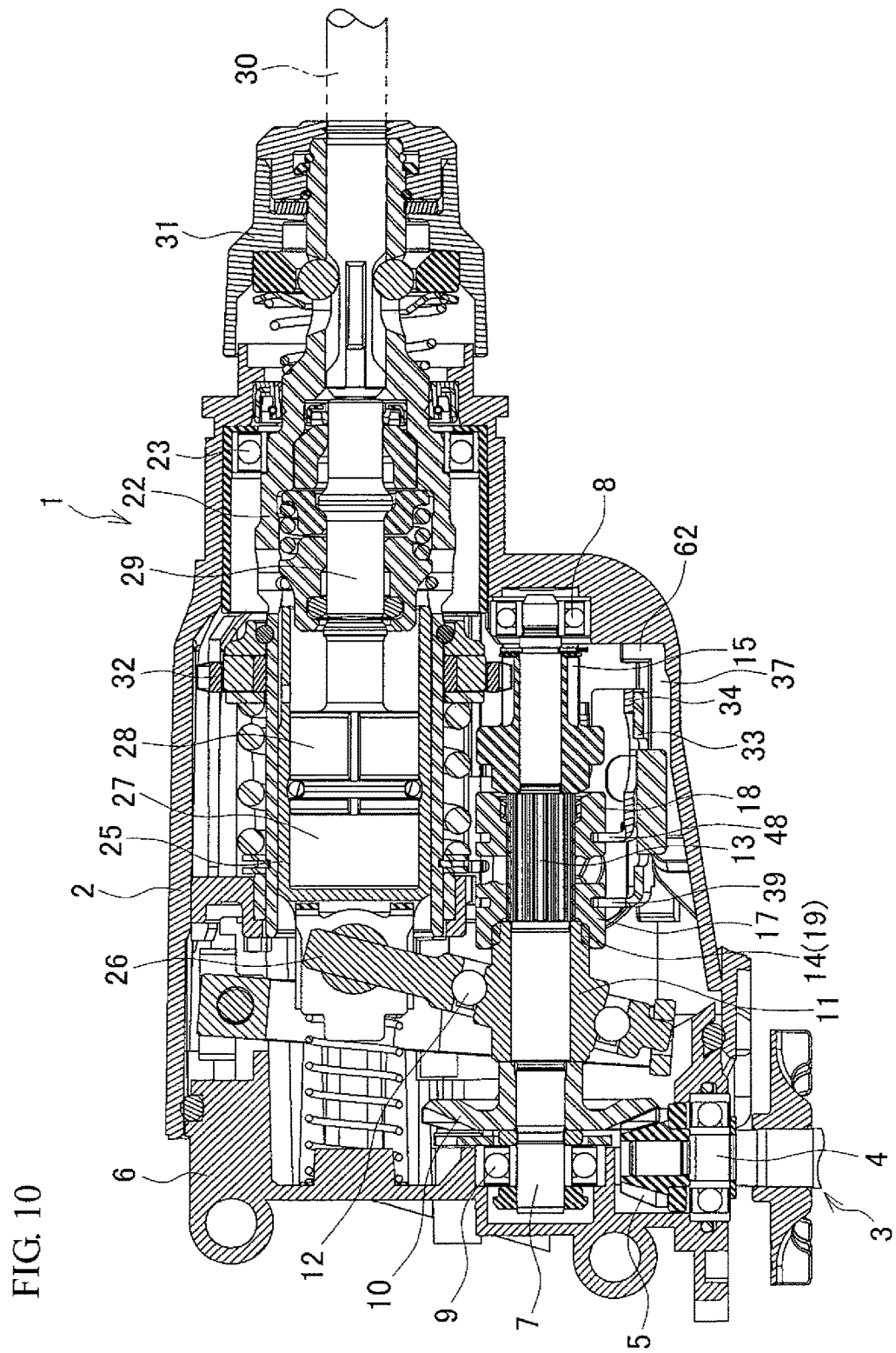
FIG. 10 is a partial vertical sectional view of the hammer drill (neutral mode).

At a rotational position at which the mode switching lever 52 has been rotated leftward by about 50° from the position for the hammer mode as illustrated in FIG. 8, the pin 53 abuts against the upper side of the rear edge of the through hole 50 as illustrated in FIGS. 9 and 10. Therefore, the second change plate 34 is kept at the retracted position, and the first change plate 33 is urged to the retracted position via the coil spring 51. Hence, only an impacting operation is transferred to the bit 30 as in the hammer mode in a state where the second clutch 18 is located at the retracted position at which the second clutch 18 is disengaged from the second gear 15, and where the first clutch 17 engages with the boss sleeve 11. As illustrated in FIG. 8, the cam portion 59 slides the lock plate 54 to the advanced position. Therefore, the lock piece 56 is disengaged from the second gear 56 to release the lock on rotation of the tool holder 22. Hence, the bit 30 can be rotated to a desired angle about the axis (neutral mode).

Figure 11:
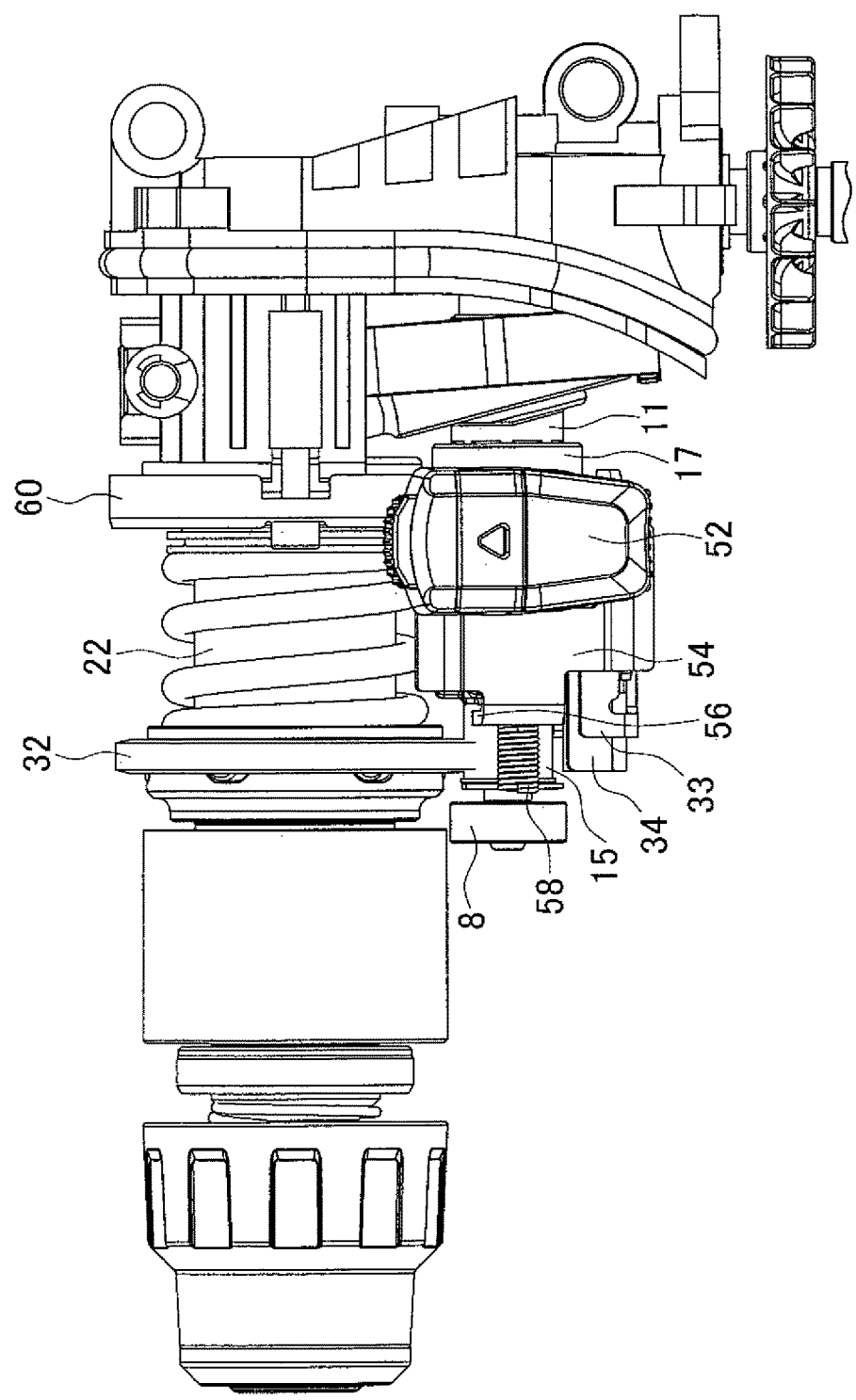
FIG. 11 is a side view of the hammer drill with the gear housing not illustrated (hammer drill mode).
Figure 12:
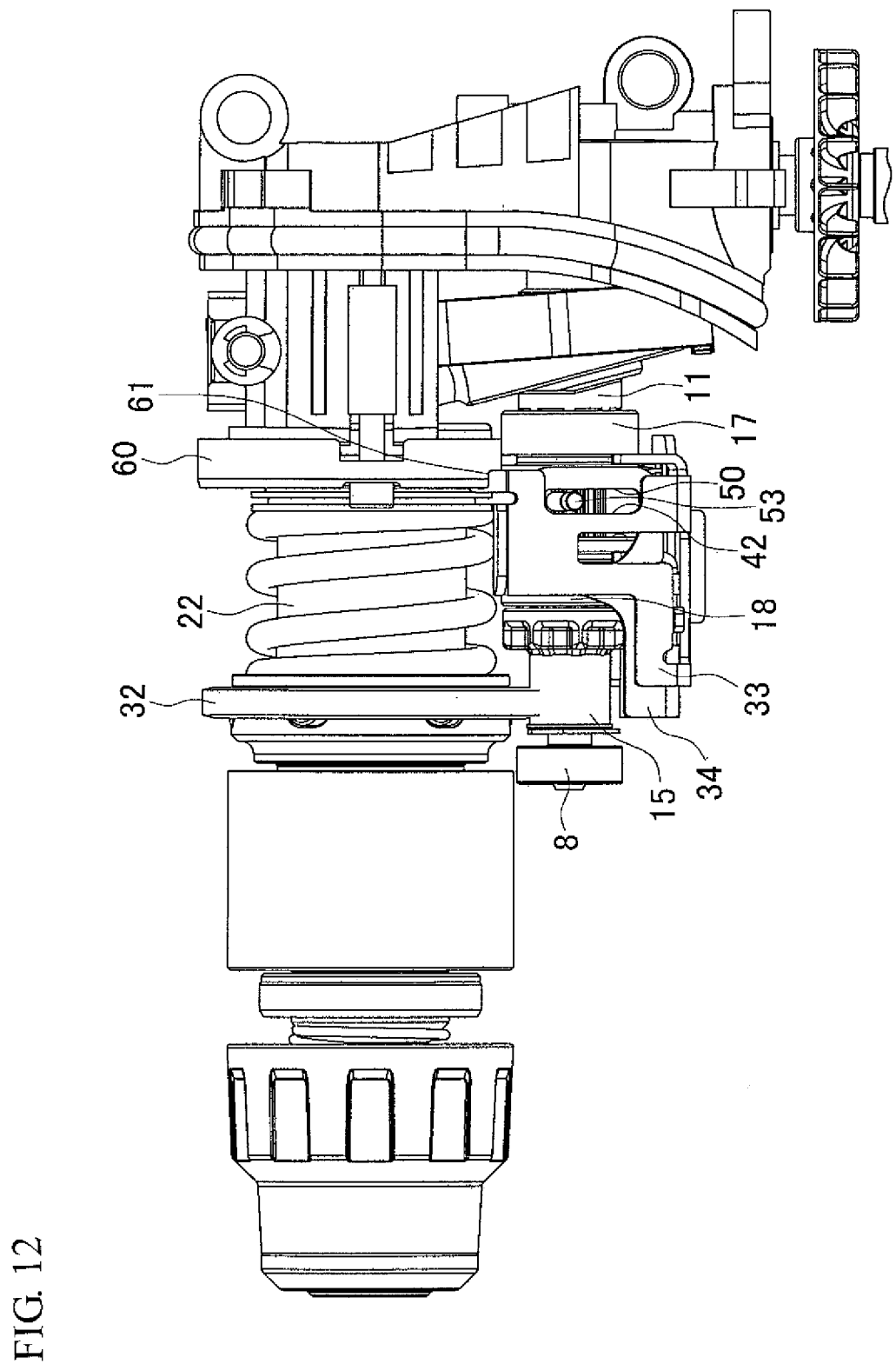
FIG. 12 is a side view of the hammer drill with the gear housing, the mode switching lever (excluding the pin), and the lock plate not illustrated (hammer drill mode).
Figure 13:
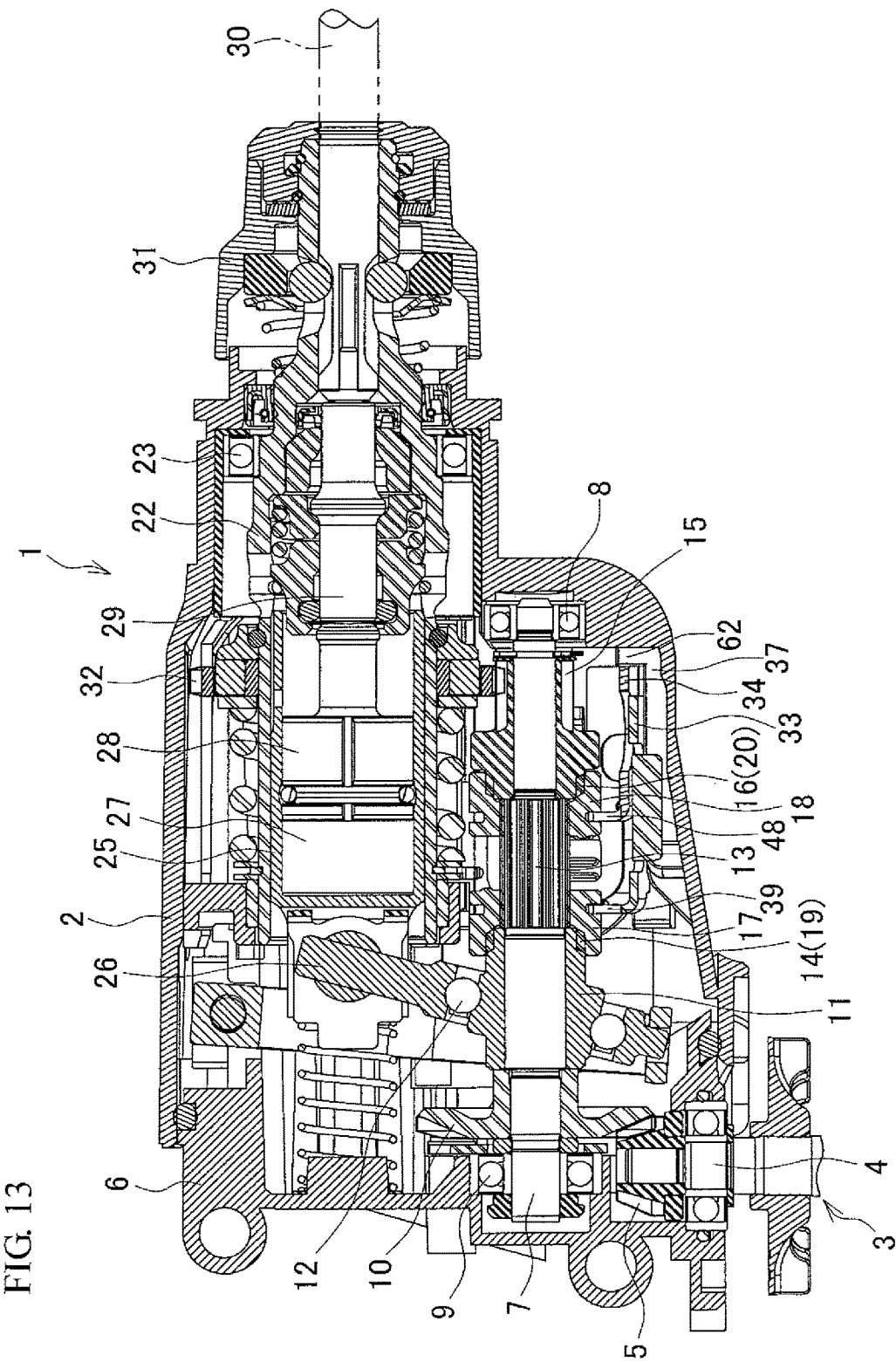
FIG. 13 is a partial vertical sectional view of the hammer drill (hammer drill mode).

At a rotational position at which the mode switching lever 52 has been rotated leftward by about 65° from the position for the neutral mode as illustrated in FIG. 11, the pin 53 is moved forward to enter the notched portion 42 of the first change plate 33 to release the restraint on the second change plate 34 from advancing as illustrated in FIGS. 12 and 13. Therefore, the first change plate 33 is kept stationary, and the second change plate 34 is urged by the coil spring 51 to be advanced. Hence, the second clutch 18 is advanced to engage with the second gear 15 while the first clutch 17 is kept engaged with the boss sleeve 11. In this manner, the hammer drill 1 is put in the hammer drill mode. At this time, the front end of the horizontal plate portion 43 of the second change plate 34 abuts against a positioning stepped portion 62 serving as a positioning portion provided at the front end of the rib 37 which supports the first change plate 33. Hence, the second change plate 34 is positioned at the advanced position at which the second clutch 18 engages with the second gear 15. In the hammer drill mode, the lock plate 54 is kept at the advanced position.

Figure 14:
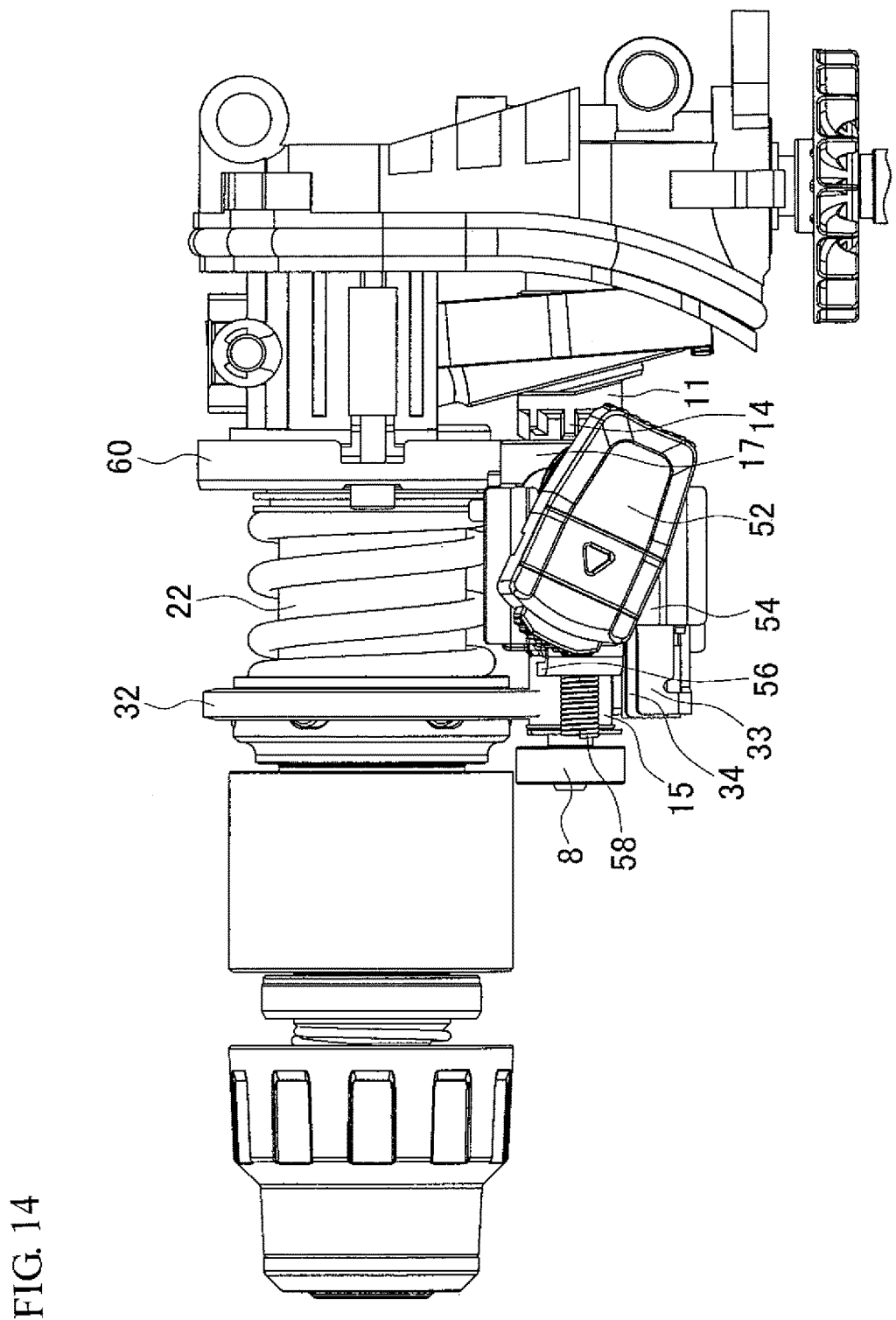
FIG. 14 is a side view of the hammer drill with the gear housing not illustrated (drill mode).
Figure 15:
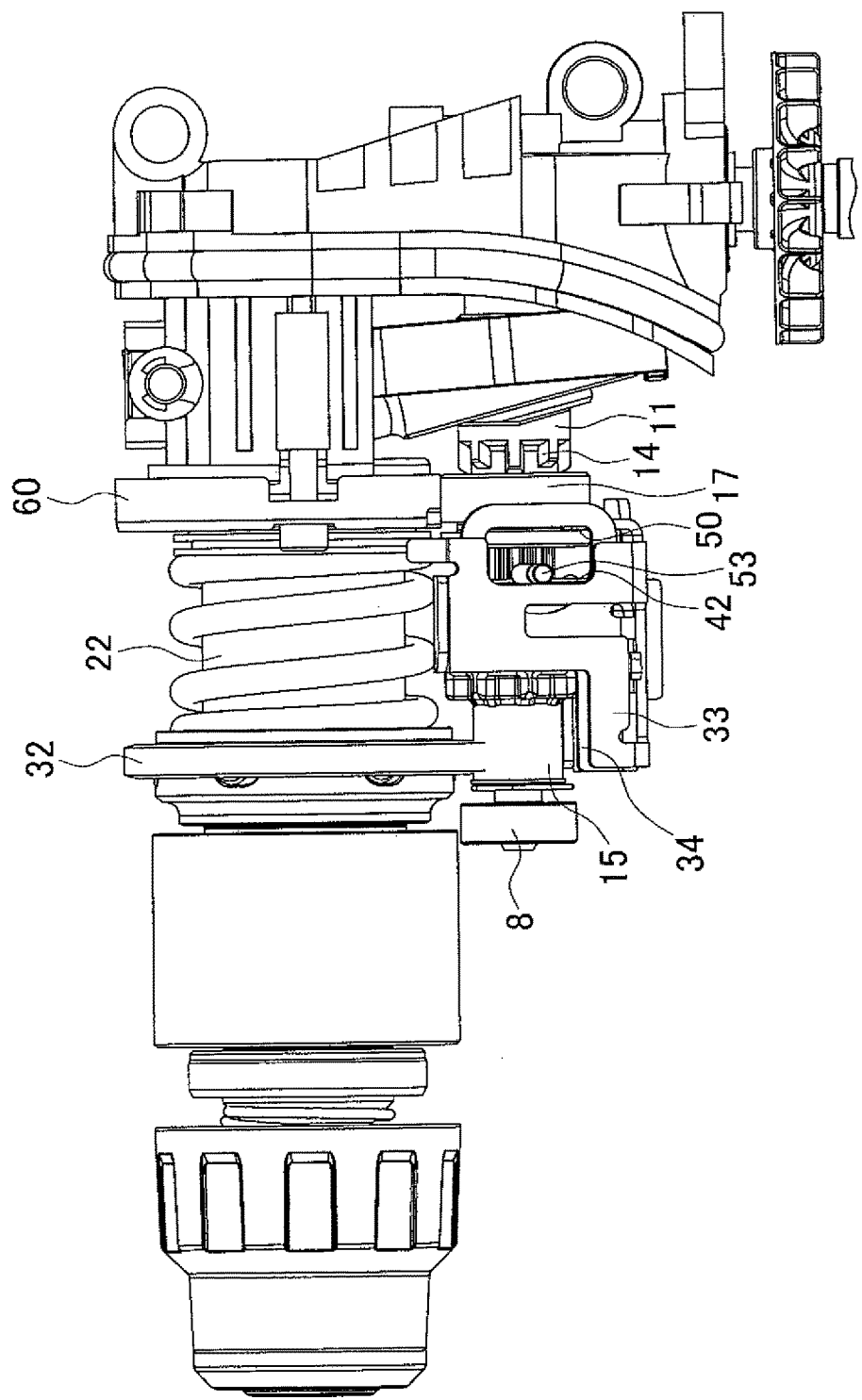
FIG. 15 is a side view of the hammer drill with the gear housing, the mode switching lever (excluding the pin), and the lock plate not illustrated (drill mode).
Figure 16:
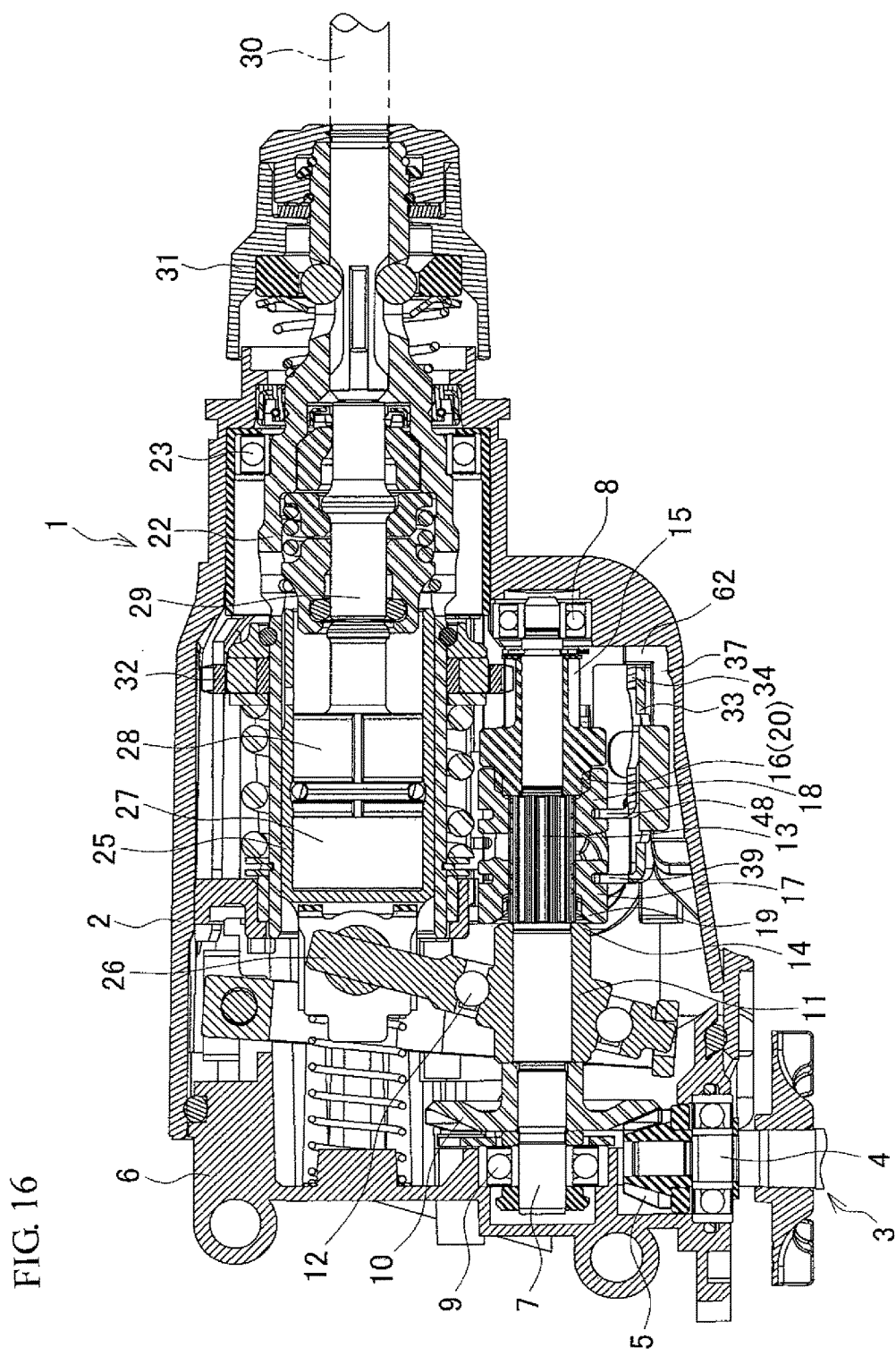
FIG. 16 is a partial vertical sectional view of the hammer drill (drill mode).

At a rotational position at which the mode switching lever 52 has been rotated leftward by about 65° from the position for the hammer drill mode as illustrated in FIG. 14, the pin 53 is moved forward in the through hole 50 of the second change plate 34 to abut against the rear end of the first change plate 33 in the notched portion 42. The second change plate 34 is kept stationary, and the first change plate 33 is advanced. Hence, the second clutch 18 is kept engaged with the second gear 15, and the first clutch 17 is advanced to be disengaged from the boss sleeve 11. In this manner, the hammer drill 1 is put in the drill mode. At this time, the lock plate 54 is kept at the advanced position.

With the hammer drill 1 according to the embodiment described above, the coil spring 51 is held between the first change plate 33, which engages with the first clutch 17 and which is slidable in the axial direction of the intermediate shaft 7, and the second change plate 34, which engages with the second clutch 18 and which is slidable in the axial direction of the intermediate shaft 7. Meanwhile, the first change plate 33 is slidably guided by the gear housing 2. Thus, the hammer drill 1 can be made compact with no need for a long intermediate shaft 7 even if two clutches, namely the first and second clutches 17 and 18, are used.

In particular, the first change plate 33 is guided by the gear housing 2, and the second change plate 34 is guided by the first change plate 33. Thus, the structure is expected to be simplified with no need for a guide member for the second change plate 34.

The first and second change plates 33 and 34 are provided with respective restraint portions (the projection 46 and the slit 47) that abut against each other to restrain slide due to urging by the coil spring 51. This enables the first and second change plates 33 and 34 to be properly assembled, improving the ease of assembly of the change plates 33 and 34.

The coil spring 51 is compressed in a state where the restraint portions (the projection 46 and the slit 47) restrain slide. This prevents the coil spring 51 from slipping off with the first and second change plates 33 and 34 in the assembled state, improving the ease of assembly of the coil spring 51.

The gear housing 2 is provided with the positioning portions (the notch 61 and the positioning stepped portion 62) to restrain slide of the first and second change plates 33 and 34 from a position at which the first clutch 17 engages with the boss sleeve 11 and the second clutch 18 engages with the second gear 15. This allows the first clutch 17 and the second clutch 18 to engage with the boss sleeve 11 and the second gear 15, respectively, at a proper position and without being pressed. Thus, heat generation is prevented.

The first clutch 17 and the second clutch 18 have the same shape. This facilitates the assembly, and reduces the trouble of part management.

In the embodiment described above, only the first change plate is guided by the gear housing, and the second change plate is guided by the first change plate. However, it is also possible that the second change plate is guided by the gear housing and the first change plate is guided by the second change plate. Alternatively, one or both of the change plates may be guided by the intermediate shaft, or both the change plates may be guided by the gear housing.

Figure 17:
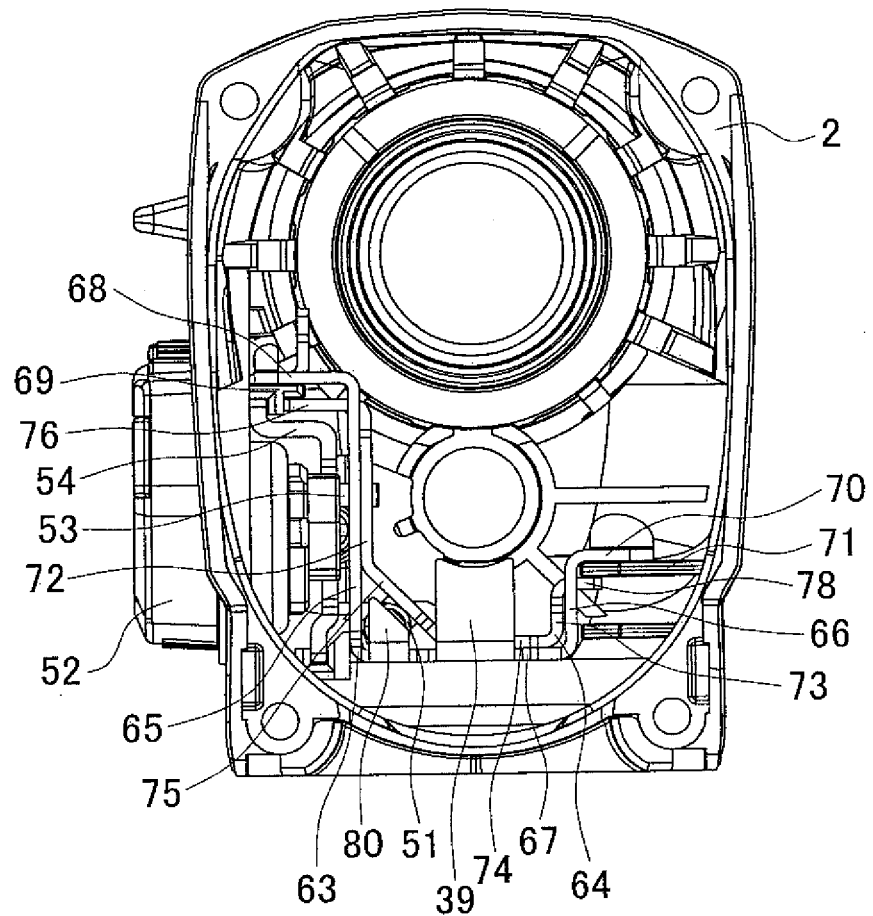
FIG. 17 illustrates a gear housing that includes a first change plate and a second change plate according to a modification as seen from the rear (with an intermediate shaft, a tool holder, etc. not illustrated).
Figure 18A:
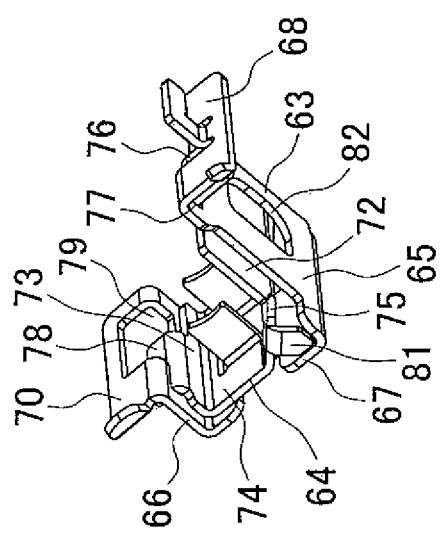
FIGS. 18A and 18B are each a perspective view of the first and second change plates according to the modification.
Figure 18B:
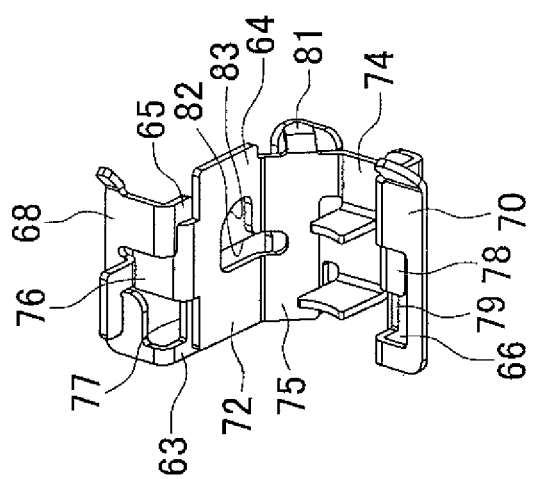

FIGS. 17 to 19 illustrate an example in which both the change plates are guided by the gear housing. In FIG. 17, the left side is the left side of the gear housing 2 as seen from the rear. In the example, a first change plate 63 has a J shape in which side plate portions 65 and 66 and a lower plate portion 67 are provided on the left, right, and lower sides of the intermediate shaft 7, respectively. A left folded piece 68 folded outward at a right angle is formed at the upper end of the left side plate portion 65. The left folded piece 68 abuts against the upper surface of a left rib 69 that projects horizontally from the left inner surface of the gear housing 2. A right folded piece 70 folded outward at a right angle is formed at the upper end of the right side plate portion 66. The right folded piece 70 abuts against the upper surface of a right rib 71 that projects horizontally from the right inner surface of the gear housing 2.

Meanwhile, a second change plate 64 is placed on the upper side of the first change plate 63. The second change plate 64 has a J shape in which side plate portions 72 and 73 and a lower plate portion 74 are provided on the left, right, and lower sides of the intermediate shaft 7, respectively. An inclined portion 75 is provided between the left side plate portion 72 and the lower plate portion 74 to form a space between the inclined portion 75 and the first change plate 63. Further, in the second change plate 64, a left folded piece 76 folded outward at a right angle is formed at the upper end of the left side plate portion 72. The left folded piece 76 penetrates a slit 77 formed in the side plate portion 65 of the first change plate 63 to project outward. The left folded piece 76 abuts against the lower surface of the left rib 69. A right folded piece 78 folded outward at a right angle is formed at the upper end of the right side plate portion 73. The right folded piece 78 penetrates a slit 79 formed in the side plate portion 66 of the first change plate 63 to project outward. The right folded piece 78 abuts against the lower surface of the right rib 71.

Hence, in the embodiment, the left rib 69 is held between the left folded pieces 68 and 76 of the first change plate 63 and the second change plate 64, respectively, and the right rib 71 is held between the right folded pieces 70 and 78 of the first change plate 63 and the second change plate 64, respectively. The first change plate 63 and the second change plate 64 are guided by the left and right ribs 69 and 71 to be slidable in the front-rear direction.

This allows the first and second change plates 63 and 64 to slide with the same sliding performance with the change plates 63 and 64 guided by the gear housing 2.

The coil spring 51 is provided in a space between the left corner portion of the first change plate 63 and the inclined portion 75 of the second change plate 64. The coil spring 51 is disposed between a spring receiving piece 80 formed to be folded upward at the rear end of the first change plate 63 and a spring receiving piece 81 formed to be folded obliquely downward at the front end of the second change plate 64. The coil spring 51 urges the first change plate 63 and the second change plate 64 in directions away from each other. Through holes 82 and 83 for insertion of the pin 53 of the mode switching lever 52 are formed in the side plate portion 65 of the first change plate 63 and the side plate portion 72 of the second change plate 64, respectively.

In the embodiment described above, besides, the lock plate is provided to enable selecting the neutral mode. However, the lock plate may be omitted to enable selecting only the three operation modes, namely the hammer mode, the hammer drill mode, and the drill mode.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A hammer drill comprising:
    an intermediate shaft provided in a housing between a motor and a tool holder, to which a bit is mountable, to receive rotation from the motor;
    an impact transfer member and a rotation transfer member each rotatably provided on the intermediate shaft, the impact transfer member being configured to cause an impact mechanism portion provided on the tool holder to operate, and the rotation transfer member being configured to rotate the tool holder;
    a first clutch and a second clutch provided between the impact transfer member and the rotation transfer member, the first clutch and the second clutch being fixedly coupled with the intermediate shaft so as to be rotatable together with the intermediate shaft and slidable in an axial direction of the intermediate shaft, the first clutch being releasably engageable with the impact transfer member, and the second clutch being releasably engageable with the rotation transfer member; and
    an elastic element that urges the first clutch and the second clutch in directions away from each other, wherein:
    one of a slide position at which only the first clutch engages with the impact transfer member, a slide position at which the first clutch engages with the impact transfer member and the second clutch engages with the rotation transfer member, and a slide position at which only the second clutch engages with the rotation transfer member is selectable by an operation of sliding the first clutch and the second clutch performed from outside the housing; and
    the elastic element is held by and between a first clutch operation member that engages with the first clutch to be slidable in the axial direction of the intermediate shaft and a second clutch operation member that engages with the second clutch to be slidable in the axial direction of the intermediate shaft, at least one of the first and second clutch operation members being slidably guided by the housing or the intermediate shaft.

2. The hammer drill according to claim 1, wherein one of the first and second clutch operation members is guided by the housing or the intermediate shaft, and the other is guided by the one of the clutch operation members.

3. The hammer drill according to claim 1, wherein the first and second clutch operation members are provided with respective restraint portions that abut against each other to restrain slide due to urging by the elastic element.

4. The hammer drill according to claim 3, wherein the elastic element is compressed in a state where the restraint portions restrain slide.

5. The hammer drill according to claim 1, wherein the housing is provided with respective positioning portions that restrain slide of the first and second clutch operation members at a position at which the first clutch engages with the impact transfer member and the second clutch engages with the rotation transfer member.

6. The hammer drill according to claim 1, wherein the first and second clutch operation members are each guided by the housing.

7. The hammer drill according to claim 1, wherein the first clutch and the second clutch have the same shape.

8. The hammer drill according to claim 1, wherein the first and second clutch operation members are each an L-shaped metal plate.

9. The hammer drill according to claim 6, wherein the first and second clutch operation members are guided by a rib provided on an inner surface of the housing.

10. The hammer drill according to claim 1, wherein the elastic element is a coil spring provided between respective spring receiving projections provided to the first clutch operation member and the second clutch operation member.

11. The hammer drill according to claim 1, wherein a mode switching lever is rotatably mounted to the housing, a pin provided at an eccentric position of the mode switching lever is engaged with the first and second clutch operation members concurrently to restrain slide of the clutch operation members, and one of the slide positions of the first and second clutches is selectable by sliding the first and second clutch operation members through an operation of rotating the mode switching lever.

12. The hammer drill according to claim 2, wherein the first and second clutch operation members are provided with respective restraint portions that abut against each other to restrain slide due to urging by the elastic element.

13. The hammer drill according to claim 12, wherein the elastic element is compressed in a state where the restraint portions restrain slide.

14. The hammer drill according to claim 12, wherein the elastic element is held in a compressed state by the first and second clutch operation members in all of the slide positions of the first and second clutches.

* * * * *